United States Patent
Jang

(10) Patent No.: US 6,907,606 B1
(45) Date of Patent: Jun. 14, 2005

(54) METHOD FOR IMPLEMENTING EVENT TRANSFER SYSTEM OF REAL TIME OPERATING SYSTEM

(75) Inventor: Min-Seok Jang, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/528,028

(22) Filed: Mar. 17, 2000

(30) Foreign Application Priority Data

Mar. 19, 1999 (KR) .......................................... 1999-9449

(51) Int. Cl.[7] ................................................ G06F 9/46
(52) U.S. Cl. ........................ 718/103; 718/107; 719/318
(58) Field of Search ................................. 718/103, 107; 719/314, 318; 709/103, 108, 314

(56) References Cited

U.S. PATENT DOCUMENTS

| | | | | |
|---|---|---|---|---|
| 4,794,526 A | * | 12/1988 | May et al. .................. | 709/103 |
| 5,247,675 A | * | 9/1993 | Farrell et al. ............... | 709/103 |
| 5,379,428 A | * | 1/1995 | Belo .......................... | 718/103 |
| 5,386,561 A | * | 1/1995 | Huynh et al. ................ | 718/103 |
| 5,596,749 A | * | 1/1997 | Cantrell et al. ............. | 709/103 |
| 5,734,903 A | * | 3/1998 | Saulpaugh et al. ......... | 709/316 |
| 6,006,247 A | * | 12/1999 | Browning et al. .......... | 709/102 |
| 6,021,425 A | * | 2/2000 | Waldron et al. ............ | 718/103 |
| 6,411,892 B1 | * | 6/2002 | van Diggelen .............. | 701/207 |

* cited by examiner

*Primary Examiner*—Meng-Al T. An
*Assistant Examiner*—Phuong N. Hoang
(74) *Attorney, Agent, or Firm*—Birch, Stewart, Kolasch & Birch, LLP

(57) ABSTRACT

In the method for implementing the event transfer system of a real time operating system kernel, the task with the highest priority first obtains the event under the multi-tasking environment which requires real time characteristics. In the case of the multi-tasking environment in which the priority-based preemptive scheduling is adapted, if a plurality of tasks with respect to one event, call a kernel system function of receiving the event, the real time operating system kernel queues the tasks into the waiting-list of the event in the priority order. In this state, when the event is sent, the task having the highest priority in the waiting-list immediately obtains the event, is woken up and is resumed in its execution.

20 Claims, 4 Drawing Sheets

METHOD FOR IMPLEMENTING EVENT TRANSFER SYSTEM OF REAL TIME OPERATING SYSTEM

BACKGROUND OF THE INVENTION

1. Field of the Invention

The present invention relates to a real time operating system kernel, and in particular to a method for implementing an event transfer system of a real time operating system kernel.

2. Description of the Background Art

Most operating systems are capable of supporting a multi-tasking feature that a plurality of tasks are concurrently executed in accordance with a user's program for an efficient use of a system. A kernel is the core program of the operating system and is run generally in the privileged mode of the system, invoked by interrupts or system calls. In addition, the above-described kernel is composed of the essential and primitive functions of an operating system such as generation and scheduling of the tasks, communication and synchronization between tasks, basic memory management, interrupt services, and device driver interfaces, etc. The characteristics and performance of the operating system are basically dependent on the kernel.

The real time operating system is adapted to a system in which certain tasks need to be executed in real time. The kernel should assure the real time task to be carried out in a certain dead-line. Therefore, the real time operating system kernel uses a preemptive scheduling mechanism generally based on a priority order.

The communication and synchronization between the tasks are important functions for the scheduling method and its performance and are implemented as a transfer system of events such as a message transfer between tasks using the queue, and the semaphore management for the mutual exclusion and synchronization between tasks. This event transfer system must be designed and implemented based on a minimization and optimization of a reaction time and on a priority-based preemptive scheduling.

In addition, since most of systems which require real time characteristics are embedded systems it is needed to reduce unnecessary functionalities and architecture of the systems and to implement the core functions that guarantee simple and effective operations.

As a solution for satisfying the above-described requirements, there can be the methods using a waiting-list to define and implement the relationship is between an event and the tasks trying to obtain it.

The known event transfer system implementation method of an operating system kernel which uses a waiting-list will be explained with reference to the accompanying drawings.

FIG. 1 is a view illustrating an example of the state of the tasks in a waiting-list of an event in the case that the known event transfer system implementation method for an operating system kernel is adapted.

As shown in FIG. 1, the first task (task 1) has a role of repeating event sending (transfer) to the event control block ECB1 of a message queue. The priority values of the first task, and second through fourth tasks 2–4 that repeat event reception are 40, 30, 20 and 20, respectively, (the lower value has the higher priority), and the second through fourth tasks 2–4 try to receive event value from a buffer of the event control block ECB1 of the first task.

When the first task (sender task), the event control block 1 of the first task, and the second through fourth tasks 2–4 are sequentially created and started to execute at a certain time interval, first of all, the first task is created and started to execute, and then the first task creates the event control block 1.

The event control block is a real structure of an event and is formed of a data structure managed by the kernel. Creating an event control block means that a task creates an event of its own. In the case that the second task 2 with the priority higher than that of the first task is created and started to execute and the second task 2 calls the kernel system function of waiting for (receiving) an event, then since the first task transfers no event yet, the second task 2 is blocked to the wait state waiting for the event to be transferred (sent) and is queued into the waiting-list of the event control block 1.

By the same reason, even though the third and fourth tasks 3 and 4 also have the higher priorities, the third and fourth tasks 3 and 4 are blocked respectively to the wait state waiting for the event and are queued into the waiting-list.

Thereafter, when the first task starts to send the event, at first the second task receives the event, is woken up and is resumed execution. Namely, the event is first transferred to the second task 2 first queued to the waiting-list based on the FIFO (First-In-First-Out), so that the second task is executed. Therefore, it causes the third and fourth tasks 3 and 4 having relatively higher priorities not to be first performed. Namely, the above-described method may be adapted to a known round robin scheduling method, but it may not satisfy the scheduling mechanism which supports real time characteristics.

In order to overcome the above-described problem, the structure of the waiting-list should be formed in a doubly linked list, and when an event is sent, the task with the highest priority should be searched in the waiting-list and resumed to execute. However, in this case, since it is not until an event is sent that the searching of the waiting-list is performed, it may take more reaction-time. And the more number of the tasks waiting for the event, the more time it takes also.

SUMMARY OF THE INVENTION

Accordingly, it is an object of the present invention to provide a method for implementing a simple and efficient event transfer system using the waiting-list of a real time operating system kernel in which a task with higher priority first obtains an event and is executed.

To achieve the above object, a method for implementing a simple and efficient event transfer system according to the present invention is characterized in that a plurality of tasks trying to receive a certain event call a kernel system function for obtaining the event under the multi-tasking environment in which the priority-based preemptive scheduling is adapted, the real time operating system kernel beforehand queues the tasks into the waiting-list of the event in the order of the priorities. After this state, when the event occurs, the task having the highest priority in the waiting-list obtains the event and is woke up to resume execution.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The method for implementing the event transfer system of a real time operating system kernel according to the present invention will be explained with reference to the accompanying drawings.

Figure 2:
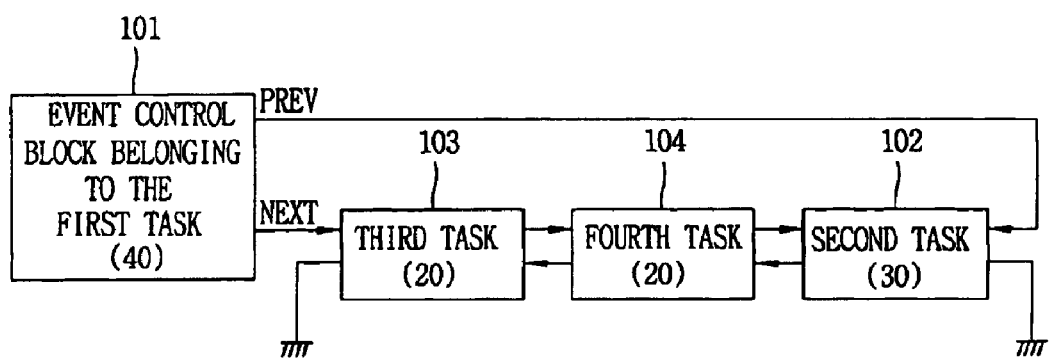
FIG. 2 is a view illustrating an example of a waiting-list of tasks with respect to an event in the case that an event transfer system implementation method of a real time operating system kernel is adapted according to the present invention.
Figure 3A:
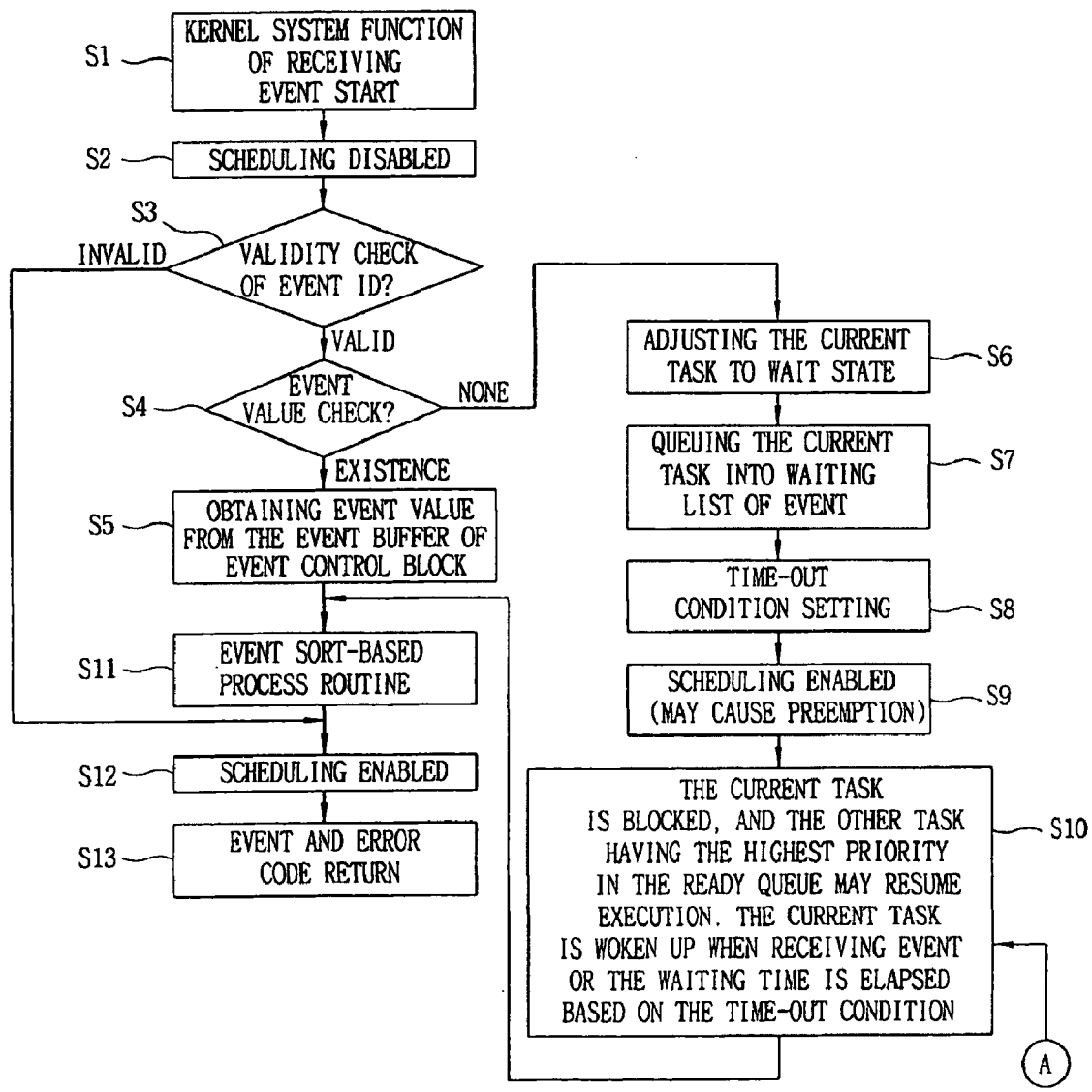
FIGS. 3A and 3B are views illustrating the internal procedures of the kernel system function-calls as an example of an event transfer system implementation method of a real time operating system kernel according to an embodiment of the present invention.
Figure 3B:
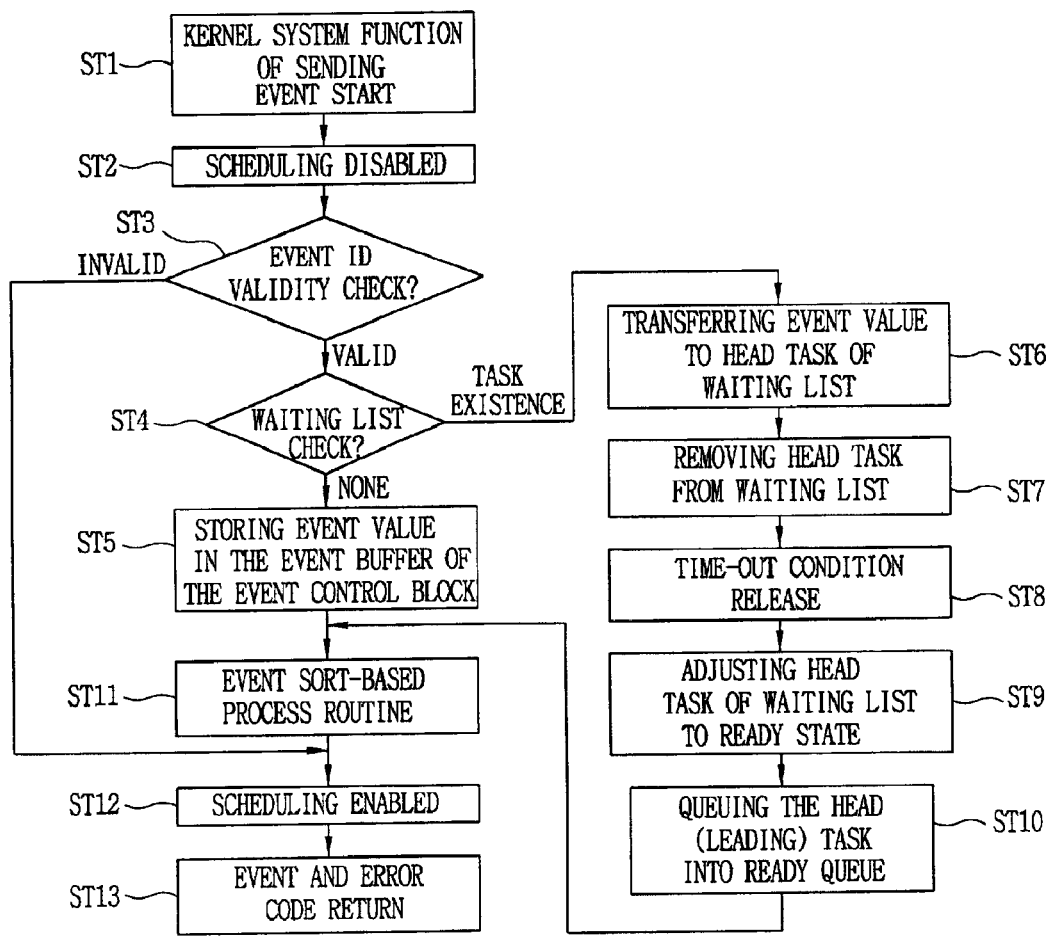
Figure 4:
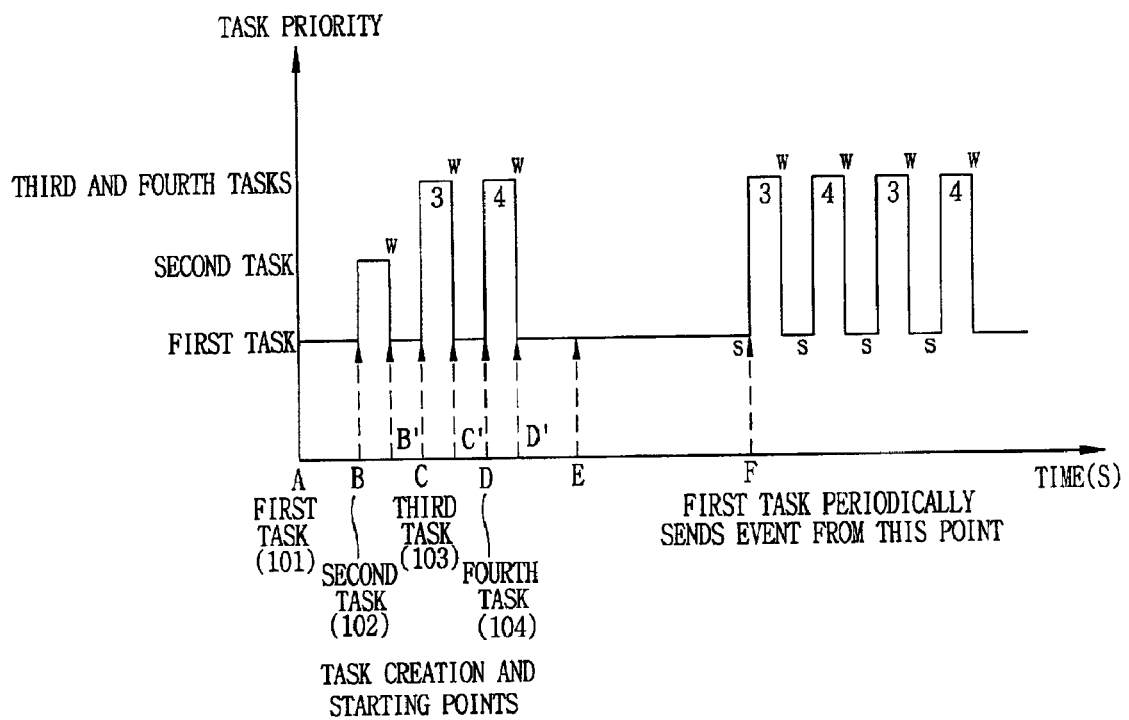
FIG. 4 is a view illustrating creation, waiting, wake-up and execution state of each task of FIG. 2.

FIG. 2 is a view illustrating an example of a waiting-list state of tasks with respect to an event in the case that the event transfer system implementation method of a real time operating system kernel is adapted according to the present invention, FIGS. 3A and 3B are views illustrating the internal procedures of the kernel system function-calls of the event transfer system implementation method of a real time operating system kernel according to an embodiment of the present invention, and FIG. 4 is a view illustrating a creation, waiting, wakeup and execution state of each task of FIG. 2.

As shown in FIG. 2, in this example, it is defined that the priority value of the first task is 40, the priority value of a second task 102 is 30, the priority values of third and fourth tasks 103 and 104 are 20, respectively (the lower priority values have the higher priority), and that the second through fourth tasks 102 through 104 are trying to receive the event which the first task transfers periodically through an event control block 101 of the first task.

As shown in FIG. 4, after the first task creates the event control block 101 at the point A, if the second through fourth tasks 102 through 104 are created and started to execute at a certain interval at the points B, C, and D, the second through fourth tasks 102 through 104 call a kernel system function of waiting for an event from the event control block 101 of the first task. In this state. since the first task did not transfer any event, the second through fourth tasks 102 through 104 are blocked respectively, and become a wait state and are queued into waiting-list of the event control block 101 of the first task at the points B', C' and D'.

Figure 1:
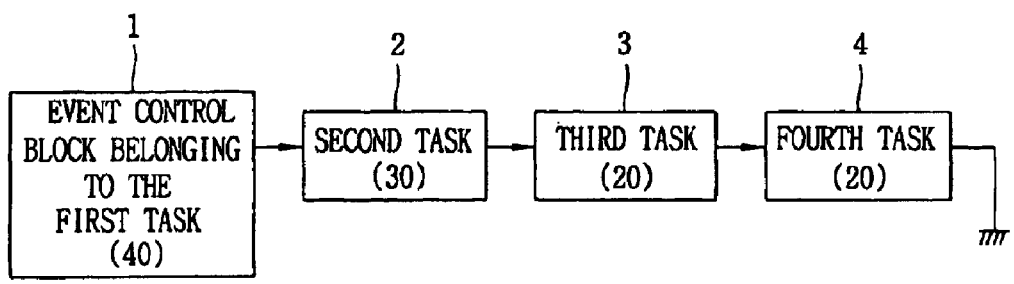
FIG. 1 is a view illustrating an example of a waiting-list state of tasks with respect to an event in which a known event transfer system implementation method of an operating system kernel is adapted.

The task order queue in the waiting-list at the time when the second through fourth tasks 102 through 104 have been all blocked (E in FIG. 4), is not the sequence of calling the kernel system function as shown in FIG. 1. Instead, the order will be the third task 103, the fourth task 104 and the second task 102 which is the priority order of tasks as shown in FIG. 2. When a kernel system function call is performed for receiving an event by each task but no event is sent yet, each task is blocked and is set to the wait state. At this point, the priority of each task is checked and the task is inserted into the position of the priority order of the waiting-list so that the waiting-list becomes the priority order. Therefore, the waiting-list is always maintained in the state of the priority order such that the task with the highest priority is placed at the head of the waiting-list.

When the first task calls a kernel system function of transferring (sending) the event from the point F of FIG. 4, the priority check is not additionally needed with respect to the tasks of the waiting-list. The task with the highest priority at the head of the waiting-list is picked up from the list, and the event value is transferred to the task, so that the execution of the task is resumed. It means that since the waiting-list is already aligned in the higher priority order, when transferring the event, the task with the highest priority of the waiting-list first obtains (receives) the event by merely waking up and resuming the head-positioned task.

As shown in FIG. 4, the event transferred by the first task is alternatively obtained by the third task 103 and the fourth task 104 having the highest priority equally, and the second task 102 which has the relatively lower priority does not obtain the event.

The internal procedures of the kernel system functions according to the present invention will be explained with reference to FIGS. 3A and 3B.

The method for implementing the event transfer system of a real time operating system kernel is implemented as kernel system functions and is formed of a pair of a kernel system function of receiving (waiting for) the event and a kernel system function of transferring (sending) the event.

As shown in the above embodiment, if each task calls the kernel system function of receiving the event or calls the kernel system function of sending the event, each task performs as the above-described operations in accordance with the internal procedures of the system functions.

First, the kernel system function of receiving (waiting for) in order for the task to obtain an event will be explained.

When a certain task (the current task) calls the kernel system function of receiving the event, the scheduling is temporarily disabled so that a context switch does not occur to other tasks in Step S2, and it is checked whether the argument ID of the event that the task receives is valid in Step S3.

As a result of the check, if the event ID is invalid, it means an error situation exists where the event-receiving attempt is performed with respect to the non-existing event. Therefore, the scheduling is enabled in Step S12, and the current task is returned from the kernel system function with an error code in Step S13.

As a result of the check, if the event ID is valid, next it is checked that whether the event value has been already transferred (sent) in Step S4. If the value exists, the event value is obtained from the buffer in the event control block in Step S5, the process routine is performed by the kind of the event in Step S11, the scheduling is enabled in Step S12, and the current task is returned from the kernel system function with the event value in Step S13.

Namely, as a result of the event value check, the fact that the event value exists means that the other task had already transferred the event. Therefore, the current task which has called the kernel system function of receiving the event does not need to be queued into the waiting-list to wait for the transmission of the event. Instead, the current task can directly get the event from the event buffer of the event control block.

As a result of the event value check, if the event value does not exist, the current task which called the kernel system function of receiving (waiting for) the event is adjusted to the wait state in Step S6 and is queued into the waiting-list of the event in Step S7.

Here, the process for queuing the current task which called the kernel system function into the waiting-list in Step S7 will be explained.

/* if the waiting-list is empty (any task that waits for a corresponding event does not exist), or if the priority of the current task is lower than the priority of the tail portion task of the waiting-list or is the same (the priority of the current task is lower than any other tasks already queued with the standby list), the current task is directly inserted into the rear end (tail) of the waiting-list. */ if the head task of waiting-list=NULL
    then shortCut=TRUE
    else if priority of current task >=priority of tail task of waiting-list
        then shortCut=TRUE
        else shortCut=FALSE
    if shortCut=TRUE
    then currentTask is inserted into the rear end (tail) of waiting-list
    return SUCCESS;

/* in the case that more than one task exist in the waiting-list, the priorities are compared, and the current task is inserted so that the tasks of the waiting-list are arranged in the priority order. */

```
prevTask = NULL;
nextTask = head task of waiting-list;
while (nextTask is not NULL)
{
    if priority of currentTask >= priority of nextTask
        then prevTask = nextTask
            nextTask = the next task of the nextTask in the
                waiting-list
            else insert currentTask between prevTask and nextTask
                return SUCCESS;
}
return FAIL;
```

The detailed procedure of Step S7 is devised by optimizing the process that the queuing is performed for thereby maintaining the priority order of the waiting-list when the task is inserted into the waiting-list of the event. Thereafter, the event is directly transferred to the task (the head (leading) task of the waiting-list) having the highest priority without the additional priority search when the kernel system function of sending the event is called.

Next in Step S8, it is checked whether a time-out condition is provided when the current task calls the kernel system function of receiving the event. If the time-out is designated, the system timer-related function of the kernel is set in order that the task should stop waiting for the event and wake-up itself in the case of receiving no event by timeout due.

When the stopped scheduling is re-enabled in Step S9, the preemption may occur.

The current task (which has called the kernel system function) which is currently being executed by now is changed to the wait state and is queued into the waiting-list of the event as above described, and is removed from the scheduling candidates of the kernel. Therefore, now when the scheduling is resumed, the kernel executes another task which satisfies the execution condition such as the highest priority among the tasks of the ready state queued in a ready-list of the kernel in Step S10. Namely, the context switch occurs between the current task which is blocked in the wait state and another task which satisfies the execution condition. Namely, a series process of preemption in which the resource used by the current task is occupied by the other task and the execution control is also switched to the other task occur in Step S10.

The situation that n-number of tasks is queued in the waiting-list of a certain event at a certain point means that the n-number of the tasks all have passed through the steps S1 through S4 and steps S6 through S10. In the above-described embodiment, the second through fourth tasks 102 through 104 have passed through the steps S1 through S4 and steps S6 through S10 and become the state of FIG. 2 (point E of FIG. 4).

The head (leading) task of the waiting-list, namely, the task having the highest priority among the tasks of the wait state is woken up and is resumed in its execution when another task which is supported to send the event calls a kernel system function of sending the event or the time-out is elapsed to thereby cause the preemption. The task routine is returned from the kernel system function of receiving the event based on the steps S11 through S13.

While, the internal details of the kernel system function of sending (transferring, posting) the event will be explained.

When a certain task which is currently being executed calls the kernel system function of sending the event in Step ST1, the scheduling is temporarily disabled like the kernel system function of obtaining the event in Step ST2, and it is checked whether the argument ID of the event that the current task sends to is valid in Step ST3. As a result of the check, if the event ID is invalid, it means that an error situation exists where the event-sending attempt is performed with respect to the non-existing event. Therefore, the scheduling is re-enabled in Step ST12, and the current task routine is returned from the kernel system function with the error code in Step ST13.

As a result of the check, if the event ID is valid, next it is checked whether the waiting task exists in the waiting-list of the event in Step ST4. if any task of the wait state does not exist with respect to the event, the event value is simply stored in the event buffer of the event control block in Step ST5, and the event kind-based process routine may be additionally performed in Step ST11. Then the scheduling is re-enabled in Step ST12, and the current task routine is returned from the kernel system function in Step ST13.

In the above-mentioned additional event storing process, in the case that there is the duplication of event value or that the exceeding value needs to be prevented by checking the state of the event buffer of the event control block based on the several sort of event, or that the overflow of the event buffer needs to be prevented, the actual storing process may be avoided and thereby generate an error code.

As a result of the task existence check of the waiting-list, if the wait state task exists, the event value is directly transferred (stored) to the event buffer of the head (leading) task of the waiting-list (namely, the task having the highest priority in the waiting list) in Step ST6, and the head (leading) task is removed from the waiting-list in Step ST7. If the time-out condition had been set, it is released in Step ST8 and then the head (leading) task is changed to the ready state in Step ST9, and queued into the ready-list (queue) of the kernel in Step ST10.

At this time, since the tasks already have been queued in the waiting-list in the priority order when the kernel system function of receiving (waiting for) the event before in Step S7, it is not necessary to search the task having the highest priority in the waiting-list.

Thereafter, if the scheduling is re-enabled in Step ST12, the preemption can be occurred, so that the task (which was the head (leading) task in the waiting-list), which has been set ready to wake up in Step ST10 is resumed in its execution.

In the method for implementing the event transfer system of a real time operating system kernel according to the present invention, the task with the highest priority first can receive (obtain) the event and is executed, so the event transfer system which is suitable for the priority-based preemptive scheduling is provided to user's real time application programs.

In addition, the method for implementing the event transfer system of the real time operating system kernel according to the present invention is directed to the pre-process waiting-list management system in which the priority of the task is checked and the task is queued into the waiting-list in the priority order when the task waits for the event. And in the present invention, the reaction time is decreased in the case that the event occurs, and the performance is enhanced for thereby avoiding the excessively complicated elements. Therefore, the present invention is easily adapted to the real time operating system kernel for the embedded systems.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a method for implementing an event transfer system of a real time operating system kernel under a multi-tasking environment in which a priority-based preemptive scheduling is adapted, a method for implementing an event transfer system of a real time operating system kernel for a plurality of tasks in the multi-tasking environment, comprising:
   each of said tasks calling a kernel system function for receiving an event with respect to one event under the multi-tasking environment; and
   blocking each of said tasks and inserting each of said tasks into a waiting-list for the event in priority order when no event is provided to the tasks, wherein all of said tasks are queued and prioritized within said waiting-list for the event;
   checking a validity of an event ID for thereby generating an error code in the case of validity when the kernel system function of receiving the event starts; and
   returning a routine from the kernel system function;
   wherein in the case that the event transfer occurs, the task having the highest priority in the waiting-list obtains the event, is activated and an execution of said highest priority task is resumed; wherein when transferring the event, the method further includes checking whether any waiting task exists in the waiting-list for the event.

2. The method of claim 1, wherein said waiting-list for the event is managed based on the priority order so that the task having the highest priority is arranged at the most leading portion (head) of the waiting-list.

3. The method of claim 1, further comprising:
   checking whether there is an event value already sent, when the kernel system function of receiving the event starts.

4. The method of claim 3, wherein as a result of the check whether the event value exists, when the event value exists, the event value is obtained and the event control block buffer, and the task routine is executed by the sort of the event.

5. The method of claim 3, wherein as a result of the check, when the event value does not exist, the current task is blocked and queued into the waiting-list for the event.

6. The method of claim 5, wherein when the current task is queued into the waiting-list, a time out option is additionally set if it exists.

7. The method of claim 3, wherein when the kernel system function of receiving the event starts, the method further comprises:
   checking a validity of an event ID for thereby generating an error code in the case of invalidity; and
   returning the routine from the kernel system function.

8. In a method for implementing an event transfer system of a real time operating system kernel under a multi-tasking environment in which a priority-based preemptive scheduling is adapted, a method for implementing an event transfer system of a real time operating system kernel for a plurality of tasks in the multi-tasking environment, comprising:
   each of said tasks calling a kernel system function for receiving an event with respect to one event under the multi-tasking environment; and
   blocking each of said tasks and inserting each of said tasks into a waiting-list for the event in priority order when no event is provided to the tasks, wherein all of said tasks are queued and prioritized within said waiting-list for the event;
   checking a validity of an event ID for thereby generating an error code in the case of validity when the kernel system function of receiving the event starts; and
   returning a routine from the kernel system function, wherein in the case that the event transfer occurs, the task having the highest priority in the waiting-list obtains the event, is activated and an execution of said highest priority task is resumed.

9. In a method for implementing an event transfer system of a real time operating system kernel under a multi-tasking environment in which a priority-based preemptive scheduling is adapted, a method for implementing an event transfer system of a real time operating system kernel for a plurality of tasks in the multi-tasking environment, comprising:
   each of said tasks calling a kernel system function for receiving an event with respect to one event under the multi-tasking environment;
   blocking each of said tasks and inserting each of said tasks into a waiting-list for the event in priority order when no event is provided to the tasks, wherein all of said tasks are queued and prioritized within said waiting-list for the event;
   wherein in the case that the event transfer occurs, the task having the highest priority in the waiting-list obtains the event, is activated and an execution of said highest priority task is resumed; wherein when transferring the event, the method further includes checking whether any waiting task exists in the waiting-list for the event; and
   checking a validity of an event ID for thereby generating an error code in the case of validity when the kernel system function of receiving the event starts.

10. The method of claim 9, wherein as a result of the check that whether the task exists in the waiting-list, when the waiting task does not exist, an event value is stored in an event buffer of an event control block.

11. The method of claim 10, wherein said head task in the waiting-list which receives the event value is adjusted to a ready state and is inserted into a ready list, and an additional process routine by the sort of the event is executed.

12. The method of claim 9, wherein as a result of the check whether the task exists in the waiting-list, when the waiting task exists, an event value is transferred to the head task of the waiting-list.

13. A method for implementing an event transfer system of a real time operating system kernel for a plurality of tasks in a multi-tasking environment, the method comprising:

each of said tasks calling a kernel system function for receiving an event with respect to one event in the multi-tasking environment;

blocking execution of each of the tasks and inserting each of the tasks into a waiting-list for the event according to a priority order when no event is provided to the tasks, wherein all of said tasks are queued and prioritized within said waiting-list for the event;

checking whether any waiting task exists in the waiting-list for the event when transferring the event; and transferring an event value to the head task of the waiting-list when said checking indicates that the waiting task exists in the waiting-list; and wherein when the kernel system function of receiving the event starts, the method further includes checking a validity of an event ID to thereby generate an error code in the case of invalidity; and returning a routine from the kernel system function.

14. The method of claim 13, further comprising:

accessing the task having the highest priority from the waiting-list for the event when the event is provided; and executing the accessed task.

15. The method of claim 13, further comprising:

checking whether an event value exists when the kernel system function of receiving the event starts.

16. The method of claim 15, wherein as a result of said checking, the current task is blocked and queued into the waiting-list for the event according to the priority order if the event value does not exist.

17. The method of claim 15, further comprising:

obtaining the event value from an event control block storage and executing the task routine when said checking indicates that the event value exists.

18. A method for implementing an event transfer system of a real time operating system kernel for a plurality of tasks in a multi-tasking environment, the method comprising:

each of said tasks calling a kernel system function for receiving an event with respect to one event in the multi-tasking environment; and blocking execution of each of the tasks and inserting each of the tasks into a waiting-list for the event according to a priority order when no event is provided to the tasks, wherein all of said tasks are queued and prioritized within said waiting-list for the event; wherein when the kernel system function of receiving the event starts, the method further includes checking a validity of an event ID to thereby generate an error code in the case of invalidity;

returning a routine from the kernel system functions;

wherein in the case that the event transfer occurs, the task having the highest priority in the waiting-list obtains the event, is activated and an execution of said highest priority task is resumed; and wherein when transferring the event, the method further includes checking whether any waiting task exists in the waiting-list for the event.

19. A method for implementing an event transfer system of a real time operating system kernel for a plurality of tasks in a multi-tasking environment, the method comprising:

each of said tasks calling a kernel system function for receiving an event with respect to one event in the multi-tasking environment;

blocking execution of each of the tasks and inserting each of the tasks into a waiting-list for the event according to a priority order when no event is provided to the tasks, wherein all of said tasks are queued and prioritized within said waiting-list for the event;

checking whether any waiting task exists in the waiting-list for the event when transferring the event;

transferring an event value to the head task of the waiting-list when said checking indicates that the waiting task exists in the waiting-list; and checking a validity of an event ID for thereby generating an error code in the case of validity when the kernel system function of receiving the event starts.

20. The method of claim 19, wherein said head task in the waiting-list which receives the event value is adjusted to a ready state and is inserted into a ready list, and an additional process routine by the sort of the event is executed.

* * * * *